(12) United States Patent
Ninomiya

(10) Patent No.: US 10,230,312 B2
(45) Date of Patent: Mar. 12, 2019

(54) VIBRATION WAVE MOTOR

(71) Applicant: CANON KABUSHIKI KAISHA, Tokyo (JP)

(72) Inventor: Shunsuke Ninomiya, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 332 days.

(21) Appl. No.: 14/797,731

(22) Filed: Jul. 13, 2015

(65) Prior Publication Data
US 2016/0020712 A1     Jan. 21, 2016

(30) Foreign Application Priority Data
Jul. 16, 2014    (JP) ................................ 2014-145638

(51) Int. Cl.
*H02N 2/02*     (2006.01)
*H02N 2/00*     (2006.01)

(52) U.S. Cl.
CPC ........... *H02N 2/026* (2013.01); *H02N 2/0015* (2013.01)

(58) Field of Classification Search
CPC .... H02N 2/0005; H02N 2/001; H02N 2/0025; H02N 2/04; H02N 2/004
USPC ....................................... 310/323.01–323.21
See application file for complete search history.

(56) References Cited

U.S. PATENT DOCUMENTS 5,821,670 A * 10/1998 Tobe ...................... H02N 2/004
                                          310/328
2005/0242686 A1* 11/2005 Yamamoto ........... H02N 2/0015
                                          310/323.02

FOREIGN PATENT DOCUMENTS

JP     2004-304887 A     10/2004
JP     2011-193670 A      9/2011
JP     2012-231622 A     11/2012

OTHER PUBLICATIONS

The above foreign patent documents were cited in the Apr. 19, 2018 Japanese Office Action, which is enclosed without an English Translation, the issued in Japanese Patent Application No. 2014145638.

* cited by examiner

*Primary Examiner* — Derek Rosenau
(74) *Attorney, Agent, or Firm* — Cowan, Liebowitz & Latman, P.C.

(57) ABSTRACT

A vibration wave motor includes a vibration plate having a flat plate portion and protruding portions, a piezoelectric element that performs high-frequency vibration, a friction member contacting the protruding portions, and a first natural vibration mode and a second natural vibration mode, which are excited in the vibration plate by the high-frequency vibration, the vibration plate and the friction member moving relatively to each other, maximum amplitude generated on tip ends of the protruding portions by the first natural vibration mode is larger than maximum amplitude generated on tip ends of the protruding portions by the second natural vibration mode, a resonance frequency of the first natural vibration mode is lower than a resonance frequency of the second natural vibration mode, and amplitudes of the first natural vibration mode and the second natural vibration mode in a frequency range at a time of drive substantially coincide with each other.

7 Claims, 14 Drawing Sheets

FIG. 2A
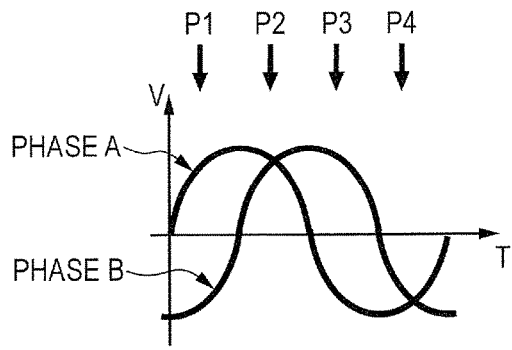
FIG. 2C    FIG. 2B    FIG. 2D
P1 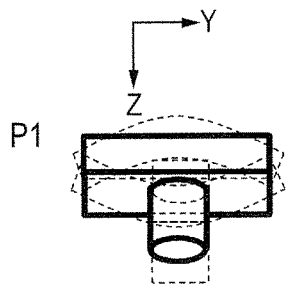 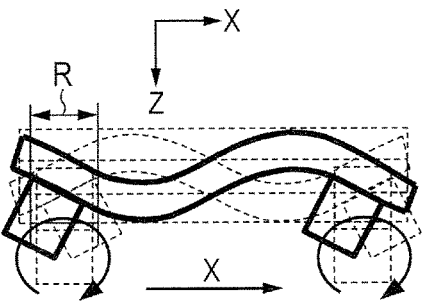 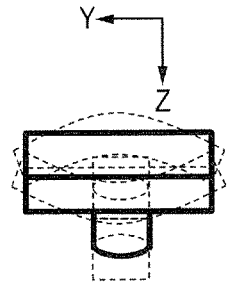
P2 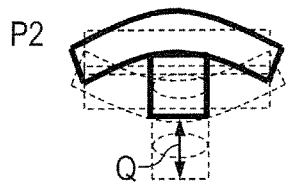 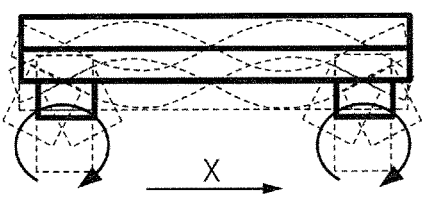 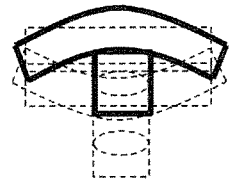
P3 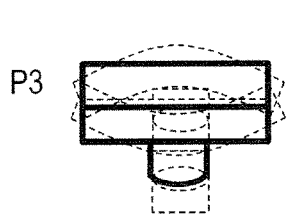 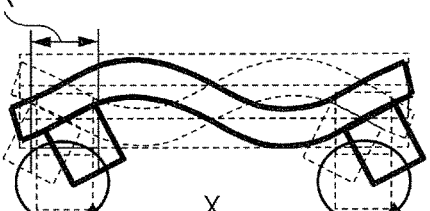 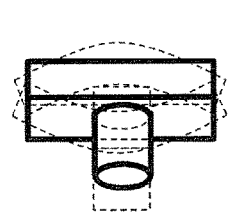
P4 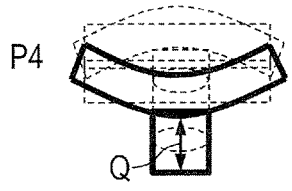 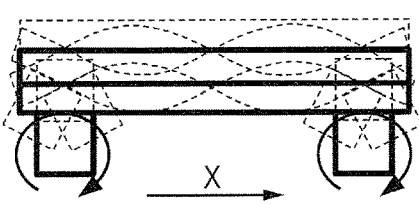 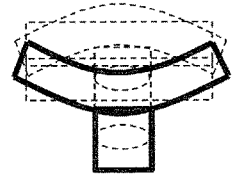

VIBRATION WAVE MOTOR

BACKGROUND OF THE INVENTION

Field of the Invention

The present invention relates to a vibration wave motor, and particularly, relates to a vibration wave motor for linear drive, in which an elastic body is formed into a plate shape.

Description of the Related Art

Heretofore, vibration wave motors, which have features such as small lightweight, high-speed drive and silent drive, have been employed for a lens barrel of an imaging device. Among them, with regard to a vibration wave motor for linear drive, a vibration wave motor as follows is disclosed in Japanese Patent Application Laid-Open No. 2004-304887.

The vibration wave motor disclosed in Japanese Patent Application Laid-Open No. 2004-304887 is composed of: a vibration plate having a rectangular flat plate portion and protruding portions provided on the flat plate portion; a piezoelectric element that is fixed to the vibration plate and performs high-frequency vibration; and a friction member brought into contact with the protruding portions. In the vibration plate, by the high-frequency vibration of the piezoelectric element, there are excited a primary natural vibration mode of a bending vibration in a short-side direction and a secondary natural vibration mode of a bending vibration in a long-side direction, in which resonance frequencies substantially coincide with each other.

Between the two natural vibration modes, in the primary natural vibration mode of the bending vibration in the short-side direction, tip ends of the protruding portions vibrate in a vertical direction with respect to the flat plate portion, and in the secondary natural vibration mode of the bending vibration in the long-side direction, the tip ends of the protruding portions vibrate in a horizontal direction with respect to the flat plate portion. These two natural vibration modes are combined with each other, whereby elliptic motion is generated in the protruding portions of the vibration plate. The protruding portions of the vibration plate are pressurized to the friction member and are brought into contact therewith, and the vibration plate and the friction member move relatively to each other in the long-side direction by friction generated by the above-mentioned elliptic motion.

In general, in a case of generating the elliptic motion by combining the two natural vibration modes as in the vibration wave motor in Japanese Patent Application Laid-Open. No. 2004-304887, then the vibrations become unstable at a frequency approximate to the resonance frequencies, and accordingly, a higher frequency range than those of the two natural vibration modes has been used for the drive. In a case where there is a difference between maximum amplitudes of the two natural vibration modes, and where the resonance frequencies the two natural vibration modes are allowed to substantially coincide with each other, then an amplitude of the primary natural vibration mode in the short-side direction becomes larger than an amplitude of the secondary natural vibration mode in the long-side direction in a frequency range at a time of the drive. Therefore, the elliptic motion generated by the two natural vibration modes has become vertically oriented elliptic motion, and a speed thereof has decreased.

As described above, there has been a problem that the speed decreases in the case where the difference is present between the maximum amplitudes of the two natural vibration modes for use in the drive of the vibration wave motor, and where the resonance frequencies of the two natural vibration modes are allowed to substantially coincide with each other.

SUMMARY OF THE INVENTION

In this connection, it is an object of the present invention to achieve enhancement of the speed by providing a difference between the resonance frequencies of the two natural vibration modes even in the case where there is a difference between the maximum amplitudes of the two natural vibration modes.

In order to achieve the foregoing object, a vibration wave motor of the present invention is a vibration wave motor including: a vibration plate having a rectangular flat plate portion and protruding portions provided on the flat plate portion; a piezoelectric element that is fixed to the vibration plate and performs high-frequency vibration; a friction member brought into contact with the protruding portions; and a first natural vibration mode and a second natural vibration mode, which are excited in the vibration plate by the high-frequency vibration, the vibration plate and the friction member moving relatively to each other, wherein maximum amplitude generated on tip ends of the protruding portions by the first natural vibration mode is larger than maximum amplitude generated on ends of the protruding portions by the second natural vibration mode, a resonance frequency of the first natural vibration mode is lower than a resonance frequency of the second natural vibration mode, and amplitudes of the first natural vibration mode and the second natural vibration mode in a frequency range at a time of drive substantially coincide with each other.

In accordance with the present invention, a difference is provided between the resonance frequencies of the two natural vibration modes, whereby the enhancement of the speed can be achieved even in the case where there is a difference between the maximum amplitudes of the two natural vibration modes.

Further features of the present invention will become apparent from the following description of exemplary embodiments with reference to the attached drawings.

BRIEF DESCRIPTION OF THE DRAWINGS

FIGS. 2A, 2B, 2C and 2D are views for explaining vibration states of the vibration wave motor of the first embodiment.

DESCRIPTION OF THE EMBODIMENTS

Figure 1A:
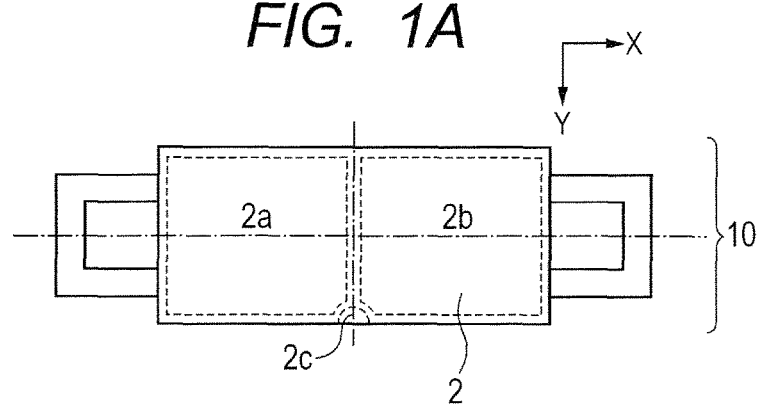
FIGS. 1A, 1B, 1C, 1D and 1E are views for explaining a configuration of a vibration wave motor of a first embodiment.

Preferred embodiments of the present invention will now be described in detail in accordance with the accompanying drawings. In the drawings, the same reference numerals denote the same members.

First Embodiment

A description is made below of a first embodiment of the present invention.

In this specification, a direction where a vibration plate 1 and a friction member 3, which will be described later, move relatively to each other is defined as an X direction. Moreover, a thickness direction of a flat plate portion 1a, which will be described later, is defined as a Z direction. Furthermore, a direction perpendicular to the X direction and the Z direction is defined, as a Y direction. In the Z direction, an orientation from the vibration plate 1 to the friction member 3 is defined, as a +Z direction, and an orientation from the friction member 3 to the vibration plate 1 is defined as a –Z direction.

Figure 1C:
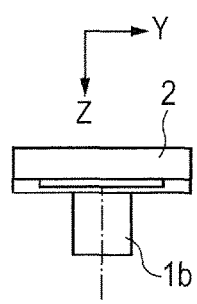
Figure 1B:
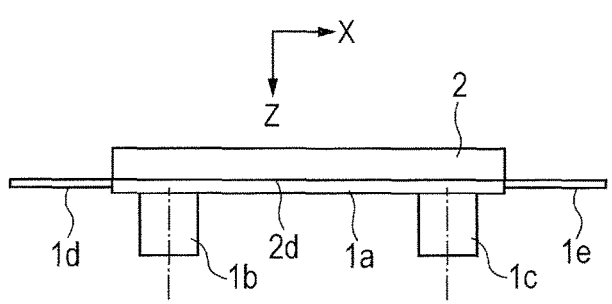
Figure 1D:
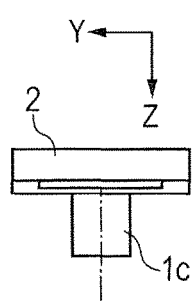

FIGS. 1A to 1E are views for explaining a basic configuration of a vibration wave motor of the first embodiment: FIG. 1A is a plan view; FIG. 1B is a front view; FIG. 1C and FIG. 1D are side views; and FIG. 1F is a bottom view.

In FIGS. 1A to 1E, the vibration plate 1 includes the rectangular flat plate portion 1a, and a protruding portions 1b and 1c provided on the flat plate portion 1a. The protruding portions 1b and 1c may be molded integrally with the flat plate portion 1a by drawing, or other members may be fixed to the flat plate portion 1a by adhesion. Note that, in the first embodiment, the flat plate portion 1a has an uneven thickness as will be described later; however, in FIGS. 1A to 1E, is illustrated as a flat plate with an even thickness for the purpose of simplification.

A piezoelectric element 2 that performs high-frequency vibration is fixed to the vibration plate 1. As shown in FIG. 1A, the piezoelectric element 2 includes two regions 2a and 2b polarized, in the same direction, the region 2a is assigned to a phase A, and the region 2b is assigned to a phase B. The piezoelectric element 2 further includes a region 2c That is not polarized, and the region 2c is an electrode to be used as a ground conducted from an entire surface electrode of a back surface 2d of the piezoelectric element 2 via a side surface thereof.

On short-side portions of a rectangular surface of the vibration plate 1, coupling portions 1d and 1e are provided, which move in synchronization with the vibration plate 1, and are directly or indirectly coupled to a vibration plate holding member that will be described later. The coupling portions 1d and 1e are provided on portions, in each of which a displacement is small in the vibration of the vibration plate 1 and the piezoelectric element 2, and have sufficiently weak rigidity, and accordingly, are formed into a shape that is less likely to inhibit the vibration. Hence, the coupling portions 1d and 1e hardly affect the vibration of the vibration plate 1 and the piezoelectric element 2. A vibration wave motor 10 is composed of the vibration plate 1 and the piezoelectric element 2, which are described above.

In the flat plate portion 1a, by the high-frequency vibration of the piezoelectric element 2, there are excited a first natural vibration mode and a second natural vibration mode, which are two natural vibration modes perpendicular to each other. Maximum amplitude generated on tip ends of the protruding portions 1b and 1c by the first natural vibration mode is larger than maximum amplitude generated on the tip ends of the protruding portions 1b and 1c by she second natural vibration mode. In the first embodiment, the first natural vibration mode is a primary natural vibration mode of a bending vibration in the short-side direction of the vibration plate 1, and the second natural vibration mode is a secondary natural vibration mode of a bending vibration in the long-side direction of the vibration plate 1.

Figure 1E:
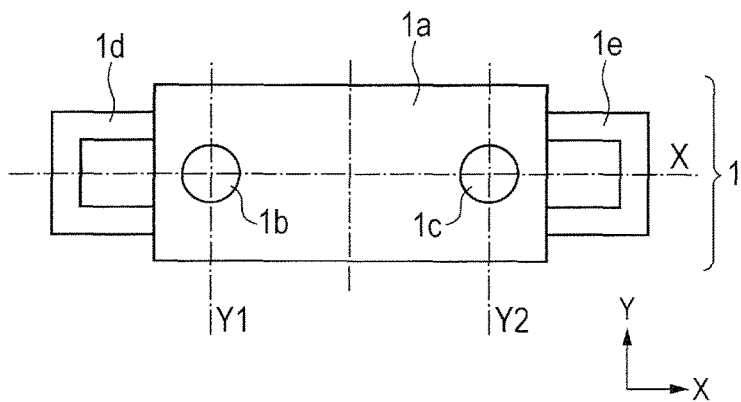

As shown in FIG. 1E, the protruding portions 1b and 1c are provided in a vicinity of an antinode (X in FIG. 1E) of the primary natural vibration mode of the bending vibration of the short-side direction, and in vicinities of nodes (Y1 and Y2 in FIG. 1E) of the secondary natural vibration mode of the bending vibration in the long-side direction. Moreover, alternating current voltages, in which a phase difference is changed from +90° to +270°, are applied to the phase A and the phase B by power feeding means (not shown), whereby the high-frequency vibration can be generated.

FIGS. 2A to 2D are views showing a state of the vibration in a case where the alternating current voltages are applied to the phase A and the phase B while delaying a phase of the phase B by approximately +90° with respect to the phase A. FIG. 2A shows changes of the alternating current voltages applied, to the phase A and phase B of the piezoelectric element, and FIG. 2B, FIG. 2C and FIG. 2D correspond to FIG. 1B, FIG. 1C and FIG. 1D, respectively, and show changes of the vibration, which are caused by the elapse of time, from P1 toward P4. Moreover, in FIG. 2A to FIG. 2D, the piezoelectric element 2 and the coupling portions 1d and 1e are omitted. Furthermore, in FIG. 2A to FIG. 2D, dotted lines show the states of the vibration.

At a time when voltages of the same symbol (polarity) are applied to the phase A and the phase B (P2 and P4 in FIG. 2A to FIG. 2D), the phase A and the phase B extend and contract in the same direction, whereby the primary natural vibration mode of the bending vibration in the short-side direction is excited, and the amplitude in the Z direction becomes maximum (arrow Q in FIG. 2C). On the contrary, at a time when voltages of different symbols (polarities) are applied to the phase A and the phase B (P1 and P3 in FIGS. 2A to 2D), the phase A and the phase B extend and contract in opposite directions, whereby the secondary natural vibration mode of the bending vibration in the long-side direction is excited, and the amplitude in the X direction becomes maximum (arrow R in FIG. 2B).

In a case where the alternating current voltages are applied to the phase A and the phase B while delaying the phase of the phase B by approximately +90° with respect to the phase A, elliptic motion as shown in FIG. 2B is generated on individual, tip ends of the protruding portions 1b and 1c. Hence, the vibration plate 1 obtains propulsive force by friction generated for a friction member, which will be described later, by the elliptic motion of the protruding portions 1b and 1c, and can perform relative movement in the X direction shown in FIG. 2B.

Moreover, in a case where the alternating current voltages are applied so the phase A and the phase B while delaying the phase of the phase B by approximately +270° with respect to the phase A, elliptic motion in a direction opposite to that of the FIG. 2A to FIG. 2D is generated, and accordingly, the vibration plate 1 obtains the propulsive force, and can perform the relative movement in a direction opposite to the X direction shown in FIG. 2B. As described above, in the vibration wave motor of the first embodiment, it is possible for the vibration plate 1 to perform the relative movement with respect to the friction member in the long-side direction of the vibration plate 1 by the elliptic motion generated on the tip ends of the protruding portions 1b and 1c by the high-frequency vibration.

Figure 3A:
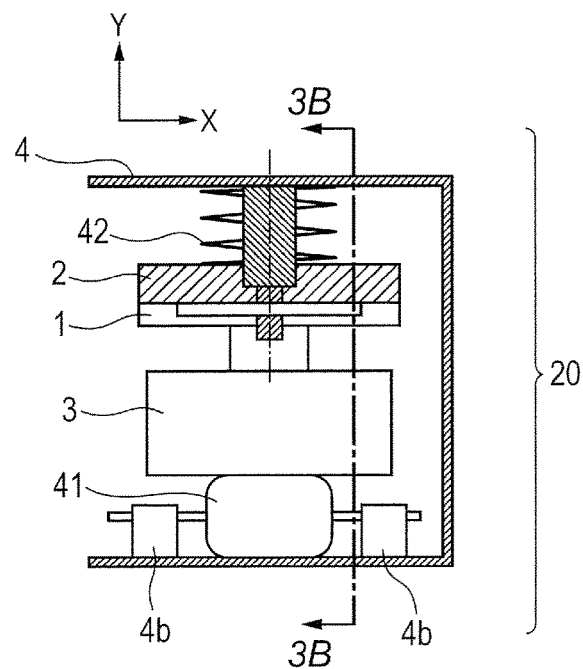
FIGS. 3A and 3B are views for explaining a configuration of a linear drive device of the first embodiment.
Figure 3B:
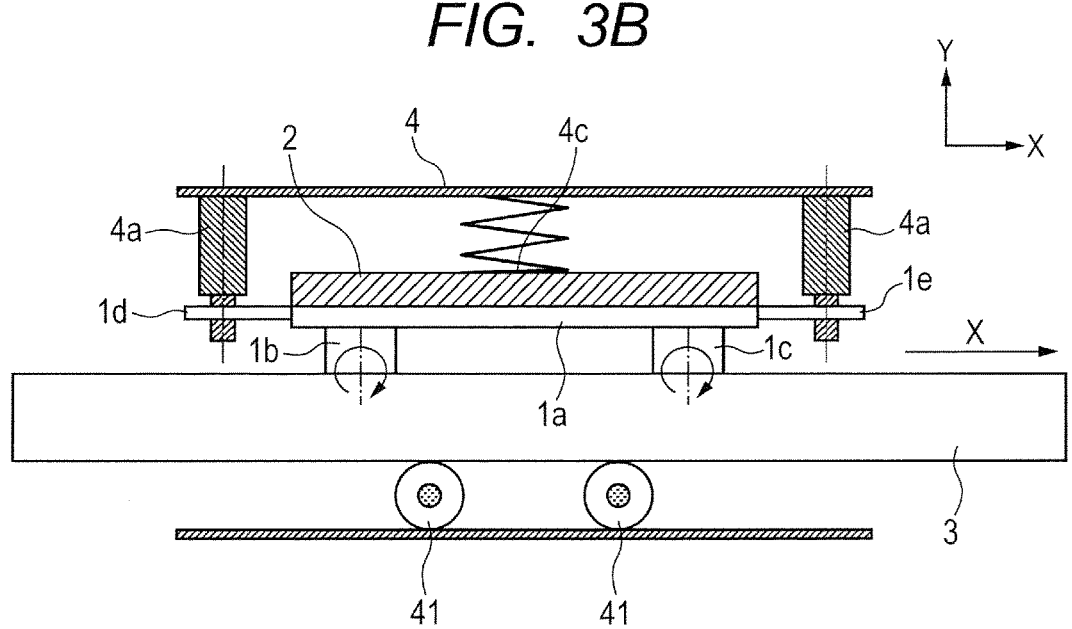

FIGS. 3A and 3B are schematic views of a linear drive device 20 using the vibration wave motor of the first embodiment: FIG. 3A is a view viewed from a traveling direction of the vibration wave motor; and FIG. 3B is an 3B-3B cross-sectional view of FIG. 3A. In FIGS. 3A and 3B, the piezoelectric element is mounted on the vibration plate 1. The protruding portions 1b and 1c of the vibration plate 1 are brought into contact with the friction member 3, and the high-frequency vibration is generated. In such a way, the vibration plate 1 can move relatively to the friction member 3 in the X direction.

The vibration plate 1 is held on a vibration plate holding member 4, and the vibration plate holding member 4 can move in synchronization with the vibration plate 1. The vibration plate holding member 4 includes vibration plate holding portions 4a on both ends thereof, and the vibration plate holding members 4a support the vibration plate 1 through the coupling portions 1d and 1e of the vibration plate 1. Moreover, the vibration plate holding member 4 includes roller support portions 4b, and on the roller support portions 4b, pivotally support rollers 41, which rotationally slide on a back surface of the friction member 3, so that the rollers 41 can be freely rotatable. A pressurizing spring 42 is provided between the vibration plate holding member 4 and the piezoelectric element 2, and a lower end 4c of the pressurizing spring 42 acts on the piezoelectric element 2, and an upper end of the pressurizing spring 42 acts on the vibration plate holding member 4.

The protruding portions 1b and 1c are brought into pressure contact with the friction member 3 by pressurization force of the pressurizing spring 42, and as mentioned above, the vibration plate holding member 4 obtains propulsive force in the X direction shown in FIG. 3B by drive force by elliptic motion as shown by arrows shown in FIG. 3B, and can move relatively in the X direction. The rollers 41 are provided in order to reduce sliding resistance in an event of the drive, and may be such a mechanism as rolling rollers.

Figure 13A:
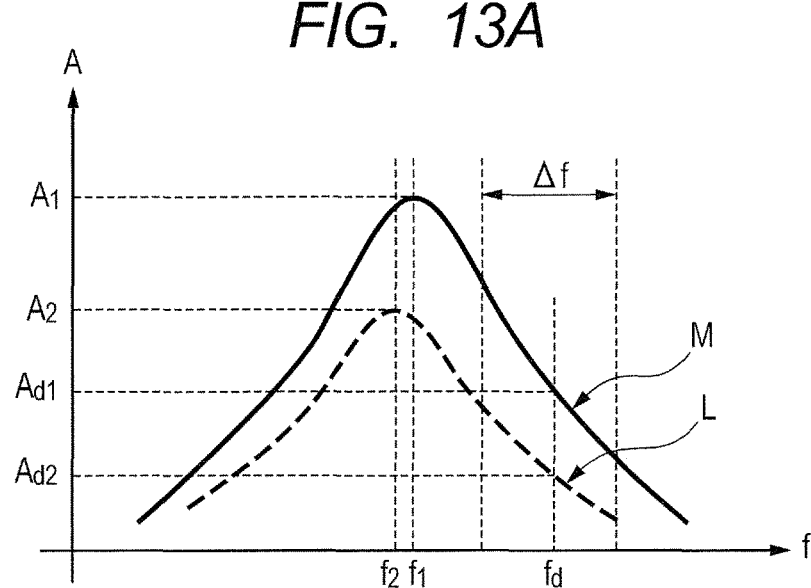
FIGS. 13A and 13B are views for explaining vertically long elliptic motion generated in a conventional example.
Figure 13B:
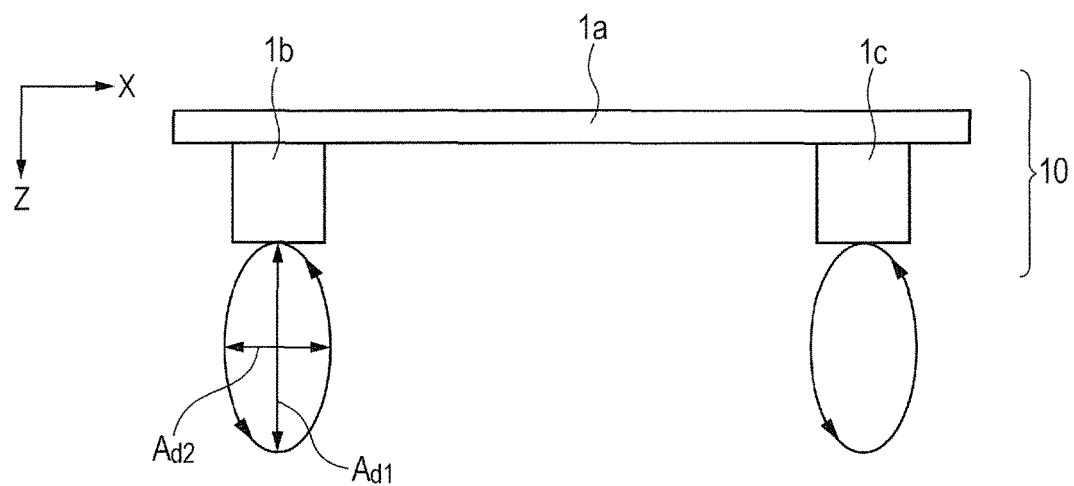

FIGS. 13A and 13B are views showing vertically long elliptic motion generated on the tip ends of the protruding portions 1b and 1c in a conventional vibration wave motor in which resonance frequencies of two natural vibration modes are allowed to coincide with each other by a similar configuration to that of this embodiment. FIG. 13A is a graph showing relationships between frequencies f and amplitudes A of the two natural vibration modes for use in the conventional vibration wave motor. A solid line M illustrates the amplitude in the Z direction in the primary natural vibration mode of the bending vibration of the short-side direction, and a dotted line L illustrates the amplitude in the X direction in the secondary natural vibration mode of the bending vibration of the long-side direction.

In FIG. 13A, $f_1$ and $f_2$ indicate the individual resonance frequencies in the primary natural vibration mode of the bending vibration in the short-side direction and in the secondary natural vibration mode of the bending vibration in the long-side direction, $\Delta f$ indicates a frequency range at the time of the drive, and $f_d$ indicates a certain drive frequency in the frequency range at the time of the drive. Moreover, $A_1$ and $A_2$ indicate the maximum amplitude in the primary natural vibration mode of the bending vibration in the short-side direction and the maximum amplitude in the secondary natural vibration mode of the bending vibration in the long-side direction, respectively. Furthermore, $A_{d1}$ and $A_{d2}$ indicate amplitudes in the primary natural vibration mode of the bending vibration in the short-side direction and amplitudes in the secondary natural vibration mode of the bending vibration in the long-side direction at the drive frequency $f_d$, respectively.

By the vibration wave motor that generates the elliptic motion by using the two natural vibration modes like the conventional vibration wave motor, it has been difficult to allow both of the maximum amplitudes $A_1$ to $A_2$ to coincide with each other. This results from that orders of the two natural vibration modes for use are different from each other, that there is a difference between a dimension in the X direction of the flat plate portion 1a and a dimension in the Y direction thereof, and that the vibration is inhibited by the coupling portions 1d and 1e. Specifically, the maximum amplitude $A_1$ generated on the tip ends of the protruding portions 1b and 1c by the primary natural vibration mode of the bending vibration in the short-side direction has been larger than the maximum amplitude $A_2$ generated on the tip ends of the protruding portions 1b and 1c by the secondary natural vibration mode of the bending vibration in the long-side direction.

Moreover, the vibration becomes unstable at the frequency approximate to the resonance frequencies, and accordingly, the frequency range $\Delta f$ at the time of the drive is set at a frequency higher than the resonance frequencies $f_1$ and $f_2$ of both of the primary natural vibration mode of the bending vibration in the short-side direction and of the secondary natural vibration mode of the bending vibration in the long-side direction. The elliptic motion is generated by the vibration of the certain frequency $f_d$ in the frequency range $\Delta f$ at the time of the drive. At this time, in a case where $A_1$ is larger than $A_2$ ($A_1 > A_2$) as mentioned above, the amplitudes at the drive frequency $f_d$ establish a relationship of $A_{d1} > A_{d2}$.

FIG. 13B shows the elliptic motion on the tip ends of the protruding portions 1b and 1c, which is generated at the drive frequency $f_d$. Magnitudes of the amplitudes of the elliptic motion of the tip ends of the protruding portions 1b and 1c in the Z direction and the X direction are determined by magnitudes of the amplitudes of the primary natural vibration mode of the bending vibration in the short-side direction and the secondary natural vibration mode of the bending vibration in the long-side direction at the drive frequency $f_d$ of FIG. 13A, respectively. $A_{d1}$ and $A_{d2}$ in FIG. 13B indicate such Z and X-direction amplitudes of the elliptic motion of the tip ends of the protruding portions 1b and 1c, respectively, and correspond to $A_{d1}$ and $A_{d2}$ in FIG. 13A.

In the vibration wave motor that generates the elliptic motion on the tip ends of the protruding portions 1b and 1c by the two natural vibration modes, it is desirable that the amplitude of the elliptic motion in the Z direction and the amplitude of the elliptic motion in the X direction be approximately equal to each other, and that elliptic motion approximate to a circle be generated. However, when $A_{d1}$ is larger than $A_{d2}$ as shown in FIG. 13E, such X-direction amplitude of the elliptic motion becomes smaller than Z-direction amplitude thereof, and accordingly, the elliptic motion generated on the tip ends of the protruding portions 1b and 1c becomes the vertically long elliptic motion, and the speed decreases.

As a method for approximately equalizing the Z-direction amplitude and X-direction amplitude of the elliptic motion to each other at the drive frequency $f_d$, there are conceived a method of adjusting height of the protruding portions 1b and 1c, a method of adjusting the resonance frequencies of the two natural vibration modes, and the like. However, while it is necessary to heighten the protruding portions 1b and 1c in order to increase the X-direction amplitude of the elliptic motion so that the X-direction amplitude thereof can become approximately equal to the Z-direction amplitude thereof in the method of adjusting the height of the protruding portions 1b and 1c, processing difficulty is increased when the protruding portions 1b and 1c are heightened, resulting in a cost increase. Therefore, in the first embodiment, the method of adjusting the resonance frequencies of the two natural vibration modes is used. A description is made below in detail of the method of adjusting the resonance frequencies of the two natural vibration modes.

Figure 4A:
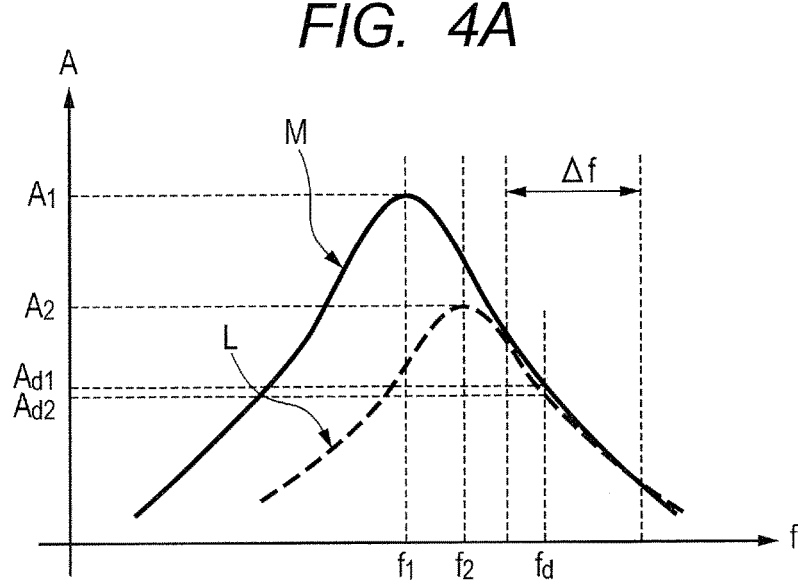
FIGS. 4A and 4B are views for explaining elliptic motion generated in the first embodiment.
Figure 4B:
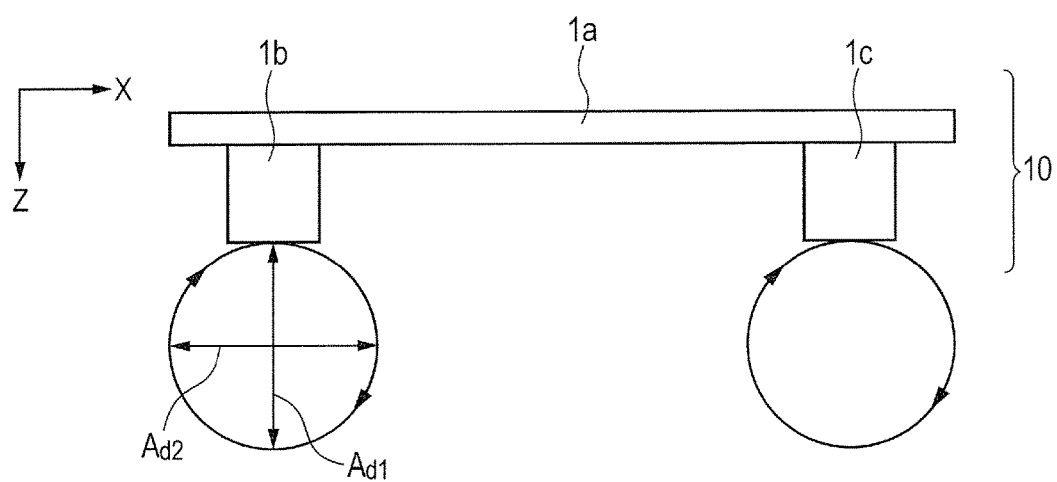

FIGS. 4A and 4B are views for explaining the elliptic motion generated in the vibration wave motor of the first embodiment. Indications of the respective drawings are similar to those of FIGS. 13A and 13B. FIG. 4A is a graph showing relationships between frequencies f and amplitudes A of the two natural vibration modes for use in the vibration wave motor of the first embodiment. The Z-direction amplitude is shown with regard to the primary natural vibration mode of the bending vibration in the short-side direction, and the X-direction amplitude is shown with regard to the secondary natural vibration mode of the bending vibration in the long-side direction. In the first embodiment, maximum amplitude $A_1$ generated on the tip ends of the protruding portions 1b and 1c at the time of the resonance of the primary natural vibration mode of the bending vibration in the short-side direction is larger than maximum amplitude $A_2$ generated on the tip ends of the protruding portions 1b and 1c at the time of the resonance of the secondary natural vibration mode of the bending vibration in the long-side direction. Therefore, the vibration wave motor of the first embodiment is designed so that the resonance frequency $f_1$ of the primary natural vibration mode of the bending vibration in the short-side direction, in which the maximum amplitude is large, can be lower than the resonance frequency $f_2$ of the secondary natural vibration mode of the bending vibration in the long-side direction, in which the maximum amplitude is small.

In particular, in the frequency range $\Delta f$ at the time of the drive, the amplitudes of the primary natural vibration mode of the bending vibration in the short-side direction and of the secondary natural vibration mode of the bending vibration in the long-side direction are allowed to substantially coincide with each other. The vibration plate 1 is designed so that the amplitudes of the two natural vibration modes in the event of the relative movement at the drive frequency $f_d$ can establish $A_{d1} \approx A_{d2}$. FIG. 4B shows the elliptic motion on the tip ends of the protruding portions 1b and 1c, which is generated at the drive frequency $f_d$. When $A_{d1} \approx A_{d2}$ is established, then the Z-direction amplitude and the X-direction amplitude, which are generated on the tip ends of the protruding portions 1b and 1c, become approximately equal to each other, and the elliptic motion of the tip ends of the protruding portions 1b and 1c can be set to elliptic motion approximate to circular motion, and accordingly, the speed can be enhanced.

As mentioned above, it is necessary that the vibration wave motor of the first embodiment be designed so that the resonance frequency $f_1$ of the primary natural vibration mode of the bending vibration in the short-side direction can be lower than the resonance frequency $f_2$ of the secondary natural vibration mode of the bending vibration in the long-side direction. In the conventional vibration wave motor, the resonance frequencies $f_1$ and $f_2$ of the two natural vibration modes have substantially coincide with each other. For this, such a Y-direction dimension of the flat plate portion 1a just needs to be increased in order to lower the resonance frequency $f_1$ of the primary natural vibration mode of the bending vibration in the short-side direction; however, this case results in an increase of the size. Moreover, such an X-direction dimension of the flat plate portion 1a just needs to be reduced in order to raise the resonance frequency $f_2$ of the secondary natural vibration mode of the bending vibration in the long-side direction; however, this case results in a decrease of the speed since there decreases the amplitude of the secondary natural vibration mode of the bending vibration in the long-side direction.

As described, above, when the dimensions are changed in order to adjust the resonance frequencies $f_1$ and $f_2$ of the two natural vibration modes, it is apprehended that the increase of the size and the decrease of the speed may be brought about. For this, the vibration plate 1 is formed into a shape with an uneven thickness so that rigidity thereof in a certain direction can be high in comparison with that of a flat plate with a constant thickness, whereby the resonance frequencies of the two natural vibration modes can be changed without changing the dimensions. In the first embodiment, the vibration plate 1 is formed into such a shape in which rigidity in the traveling direction becomes high in comparison with that of the flat plate with a constant thickness, whereby the resonance frequency of the secondary natural vibration mode of the bending vibration in the long-side direction rises to establish $A_{d1} \approx A_{d2}$ in the frequency range $\Delta f$ at the time of the drive.

Figure 5A:
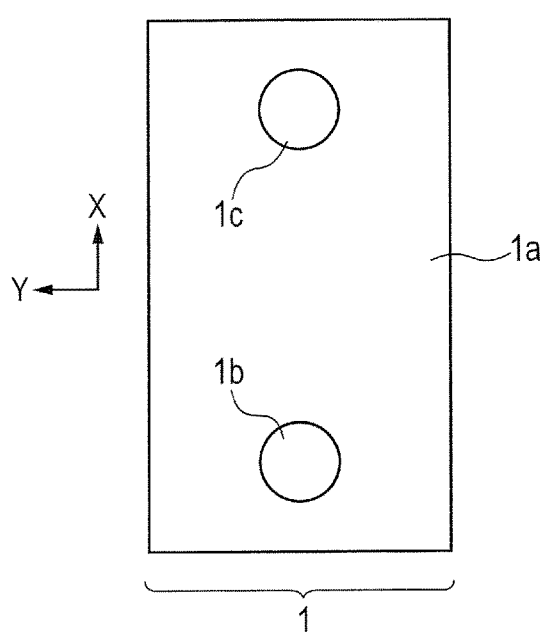
FIGS. 5A, 5B, 5C and 5D are views for explaining a shape of a vibration plate of the first embodiment.
Figure 5B:
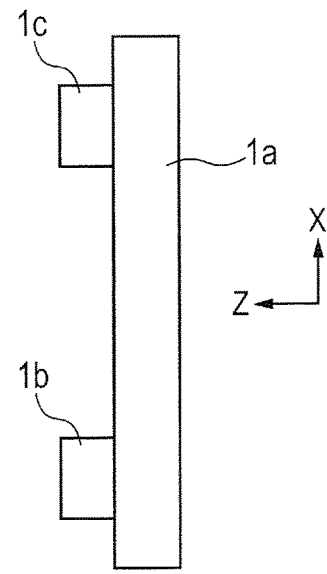
Figure 5C:
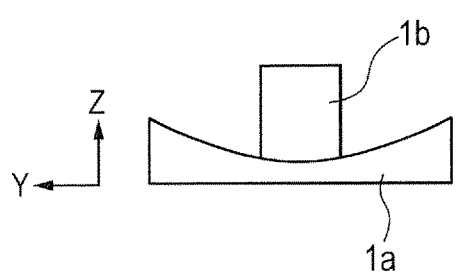
Figure 5D:
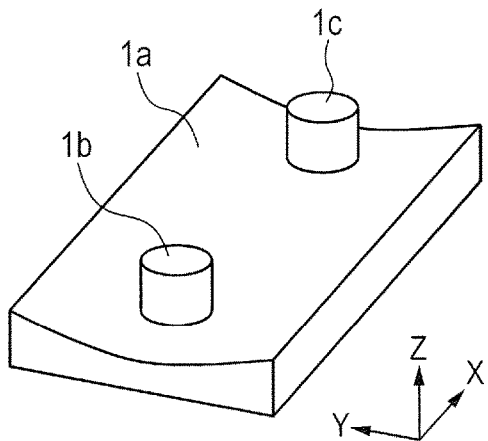

FIGS. 5A to 3D are views for explaining the shape of the vibration plate for use in the vibration wave motor of the first embodiment. FIGS. 5A, 5B, 5C and 5D show a front view of the vibration plate 1, a side view thereof in the long-side direction, a side view thereof in the short-side direction, and a perspective view of a bottom surface thereof, respectively. Note that, in FIG. 5A to FIG. 5D, the piezoelectric element 2 and the coupling portions 1d and 1e are omitted. In the flat plate portion 1a, a cross-sectional shape thereof in the short-side direction is formed into a recessed shape composed of a circular arc as shown in FIG. 5C on an X-Z plane perpendicular to the flat plate portion 1a so that the rigidity in the traveling direction can become high in comparison with that of the flat plate with a constant thickness. This recessed shape refers to a shape in which one side among four sides of a rectangle is formed into an inwardly projecting curve.

The vibration plate 1 is formed into the shape as described above, whereby the X-direction rigidity increased in comparison with the flat plate with a constant thickness, and there rises the resonance frequency of the secondary natural vibration mode of the bending vibration in the long-side direction. In such a way, the resonance frequency of the secondary natural vibration mode of the bending vibration in the long-side direction can be ad lusted so as to establish $A_{d1} \approx A_{d2}$ in FIG. 4A without changing the X-direction dimension and Y-direction dimension of the flat plate portion 1a. $A_{d1} \approx A_{d2}$ is established in the frequency range $\Delta f$ at the time of the drive, whereby the elliptic motion generated on the tip ends of the protruding portions 1b and 1c becomes the elliptic motion approximate to the circle, and accordingly, the speed can be enhanced.

As described above, in the vibration wave motor of the first embodiment, the cross-sectional shape of the flat plate portion 1a is formed into the recessed shape, whereby the resonance frequency can be adjusted without being accompanied with the increase of the size and the decrease of the speed. Moreover, a difference is provided between the resonance frequencies $f_1$ and $f_2$ of the two natural vibration modes, whereby the elliptic motion approximate to the circle can be generated on the tip ends of the protruding portions 1b and 1c in the frequency range Δf at the time of the drive. As a result, even in a case where there is a difference between the maximum amplitudes $A_1$ and $A_2$ of the two natural vibration modes, the enhancement of the speed can be achieved.

Note that, in the first embodiment, the description has been made of the method of adjusting the resonance frequency so that the rigidity of the vibration plate 1 in the traveling direction can be increased; however, the resonance frequency can also be adjusted in such a manner that rigidity thereof in the direction perpendicular to the traveling direction is decreased by reducing the entire thickness thereof.

Second Embodiment

A description made below of a second embodiment for embodying the invention.

In the first embodiment, while referring no FIGS. 13A and 13B, the description is made of the case where the first natural vibration mode is the primary natural vibration mode of the bending vibration in the short-side direction of the vibration plate 1, and the second natural vibration mode is the secondary natural vibration mode of the bending vibration in the long-side direction of the vibration plate 1. That is to say, the maximum amplitude $A_1$ generated by the primary natural vibration mode of the bending vibration in the short-side direction becomes larger than the maximum amplitude $A_2$ generated by the secondary natural vibration mode of the bending vibration in the long-side direction. Therefore, the elliptic motion approximate to the circle is generated by increasing the rigidity of the vibration plate 1 in the traveling direction.

The second embodiment is different from the first embodiment in that the first natural vibration mode is the secondary natural vibration mode of the bending vibration in the long-side direction of the vibration plate 1, and that the second natural vibration mode is the primary natural vibration mode of the bending vibration in the short-side direction of the vibration plate 1. That is to say, the maximum amplitude $A_2$ generated by the secondary natural vibration mode of the bending vibration in the long-side direction becomes larger than the maximum amplitude $A_1$ generated by the primary natural vibration mode of the bending vibration in the short-side direction. Therefore, the elliptic motion approximate to the circle is generated by increasing the rigidity in the direction perpendicular to the traveling direction of the vibration plate 1. Note that the same members as those in the first embodiment are illustrated by the same reference numerals. Moreover, a description of the same portions as those of the first embodiment is omitted, and a description is made of only portions different from those of the first embodiment.

Figure 14A:
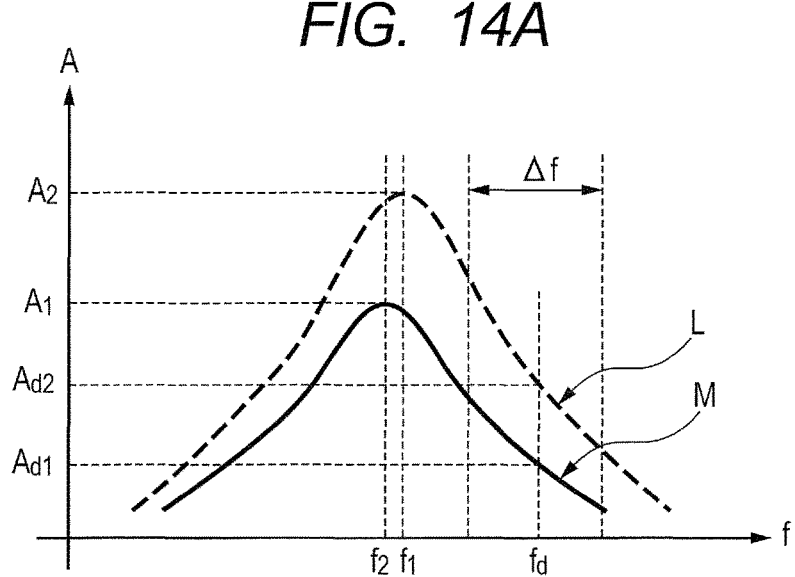
FIGS. 14A and 14B are views for explaining horizontally long elliptic motion generated in the conventional example.
Figure 14B:
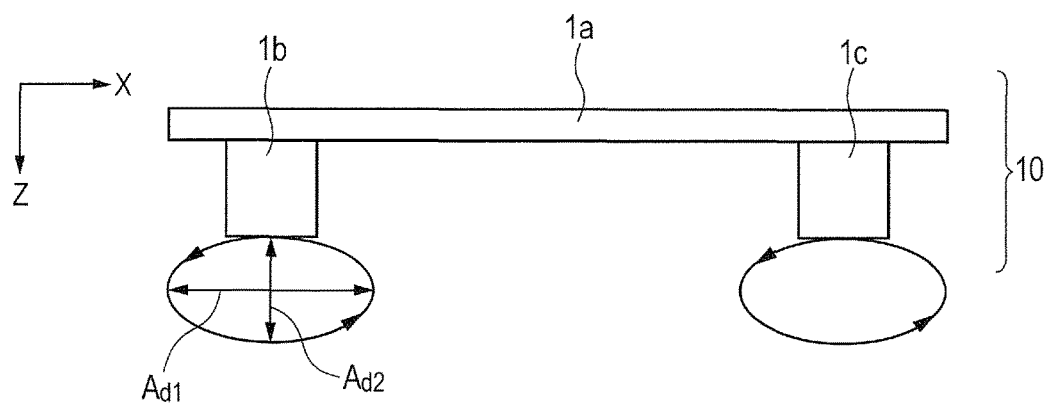

FIGS. 14A and 14B are views showing vertically long elliptic motion generated on the tip ends of the protruding portions 1b and 1c in the event where the resonance frequencies of the conventional two natural vibration modes are allowed to coincide with each other. Indications of the respective drawings are similar to those of FIGS. 13A and 13B. As shown in FIG. 14A, depending on the shape of the protruding portions 1b and 1c and on the shape of the coupling portions 1d and 1e, the maximum amplitude $A_2$ generated by the secondary natural vibration mode of the bending vibration in the long-side direction becomes larger than the maximum amplitude $A_1$ generated by the primary natural vibration mode of the bending vibration in the short-side direction.

In this event, by the fact that the maximum amplitude $A_2$ is larger than the maximum amplitude $A_1$, the Z-direction amplitude of the elliptic motion generated as shown in FIG. 14B becomes smaller than the X-direction amplitude thereof. Therefore, the elliptic motion generated on the tip ends of the protruding portions 1b and 1c becomes horizontally long elliptic motion, the Z-direction amplitude falls short, and accordingly, the drive becomes unstable.

For this, as a method for approximately equalizing the Z-direction amplitude and X-direction amplitude of the elliptic motion to each other at the drive frequency $f_d$, there are conceived a method of adjusting height of the protruding portions 1b and 1c, a method of adjusting the resonance frequencies of the two natural vibration modes, and the like. In the method of adjusting the height of the protruding portions 1b and 1c, it is necessary to lower the protruding portions 1b and 1c in order to decrease the X-direction amplitude of the elliptic motion so that the X-direction amplitude thereof can become approximately equal to the Z-direction amplitude thereof. However, if the protruding portions 1b and 1c are lowered, then the X-direction amplitude generated on the tip ends of the protruding portions 1b and 1c becomes small, and accordingly, the speed decreases. Therefore, in the second embodiment, the method of adjusting the resonance frequencies of the two natural vibration modes is used. A description is made below in detail the method of adjusting the resonance frequencies of the two natural vibration modes.

Figure 6A:
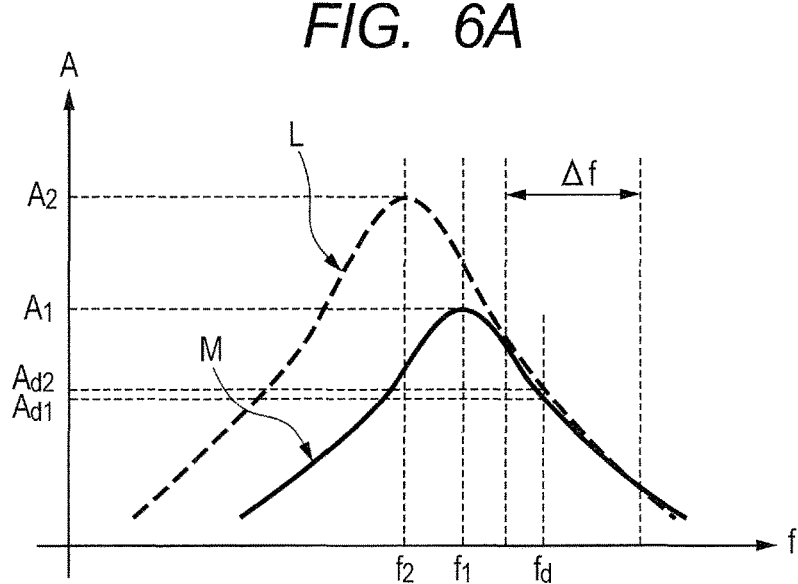
FIGS. 6A and 6B are views for explaining elliptic motion generated in a second embodiment.
Figure 6B:
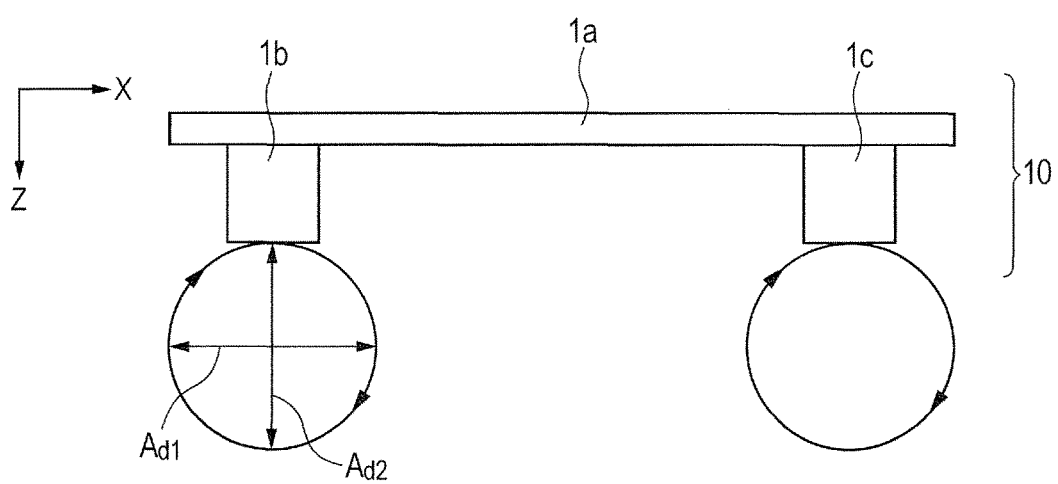

FIGS. 6A and 6B are views explaining the elliptic motion generated in the vibration wave motor of the second embodiment. Indications of the respective drawings are similar to those of FIGS. 4A and 4B. In the second embodiment, the maximum amplitude $A_2$ generated on the tip ends of the protruding portions 1b and 1c at the time of the resonance of the secondary natural vibration mode of the bending vibration in the long-side direction is larger than the maximum amplitude $A_1$ generated on the tip ends of the protruding portions 1b and 1c at the time of the resonance of the primary natural vibration mode of the bending vibration in the short-side direction.

Therefore, the vibration wave motor is designed so that the resonance frequency $f_2$ of the secondary natural vibration mode of the bending vibration in the long-side direction, in which the maximum amplitude is large, can be lower than the resonance frequency $f_1$ of the primary natural vibration mode of the bending vibration in the short-side direction, in which the maximum amplitude is small. In particular, the vibration plate 1 is designed so that the amplitudes of the first natural vibration mode and the second natural vibration mode can be allowed to substantially coincide with each other in the frequency range at the time of the drive, and that the amplitudes in the event of the relative movement at the drive frequency $f_d$ can establish $A_{d1} \approx A_{d2}$. FIG. 6B shows the elliptic motion on the tip ends of the protruding portions 1b and 1c, which is generated at the drive frequency $f_d$. When $A_{d1} \approx A_{d2}$ is established, then the Z-direction amplitude and the X-direction amplitude, which are generated on the tip ends of the protruding portions 1b and 1c, become approximately equal to each other, and the elliptic motion of the tip ends of the protruding portions 1b and 1c can be set to the elliptic motion approximate to the circle, and accordingly, stable drive can be realized.

Figure 7A:
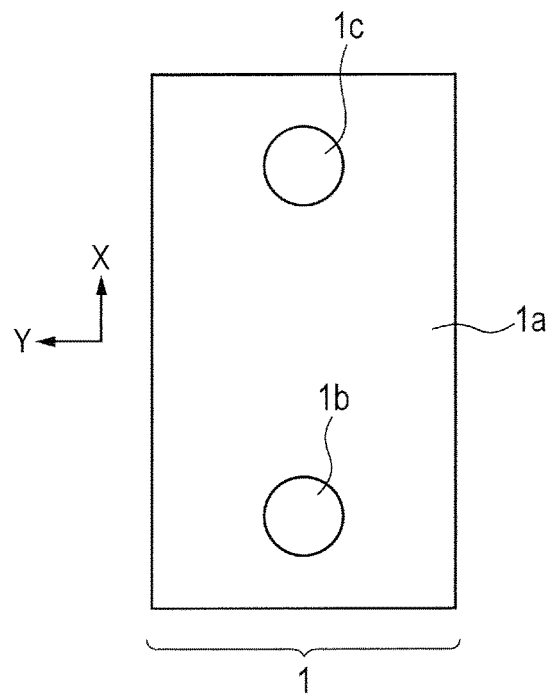
FIGS. 7A, 7B, 7C and 7D are views for explaining a shape of a vibration plate of the second embodiment.
Figure 7B:
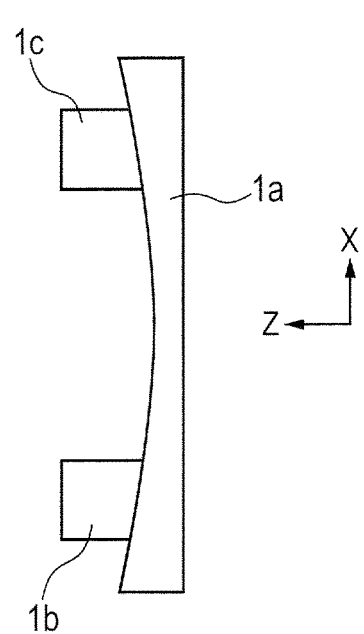
Figure 7C:
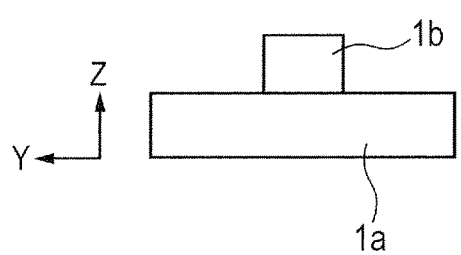
Figure 7D:
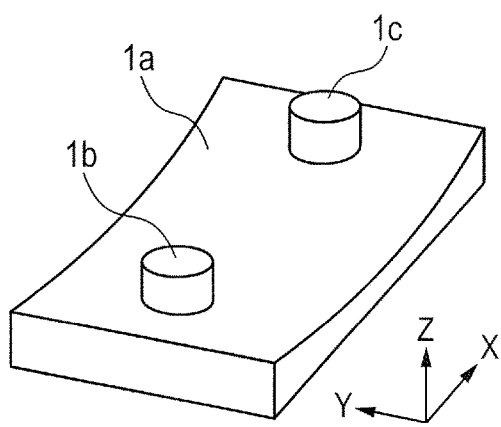
Figure 8A:
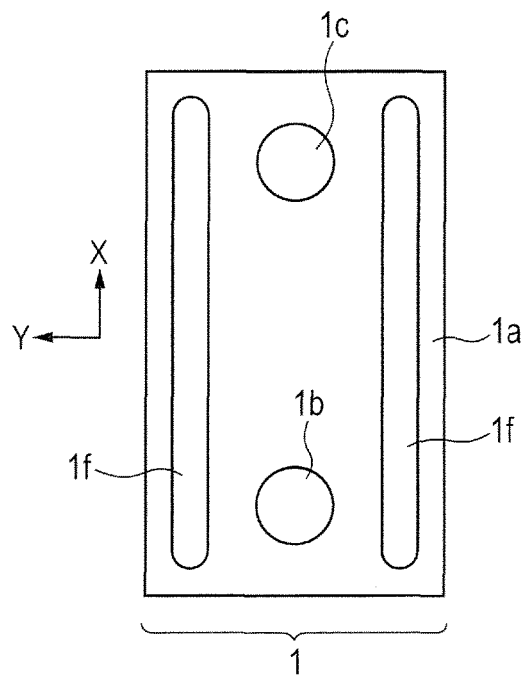
FIGS. 8A, 8B, 8C and 8D are views for explaining a shape of a vibration plate of a third embodiment.
Figure 8B:
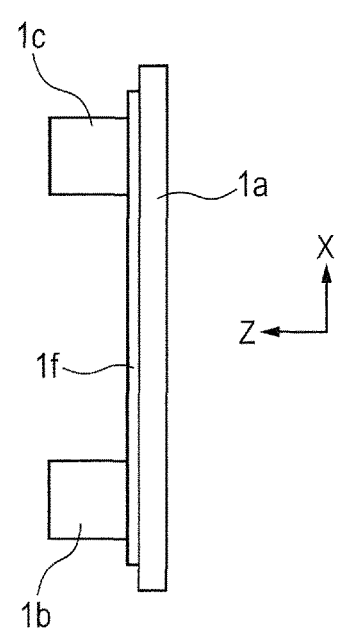
Figure 8C:
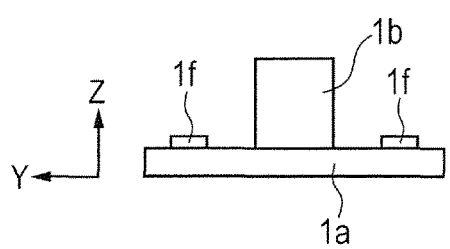
Figure 8D:
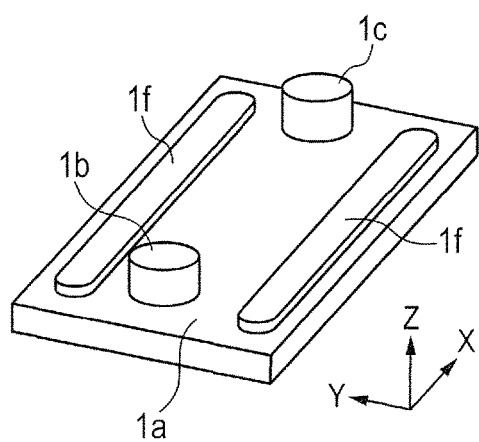
Figure 9A:
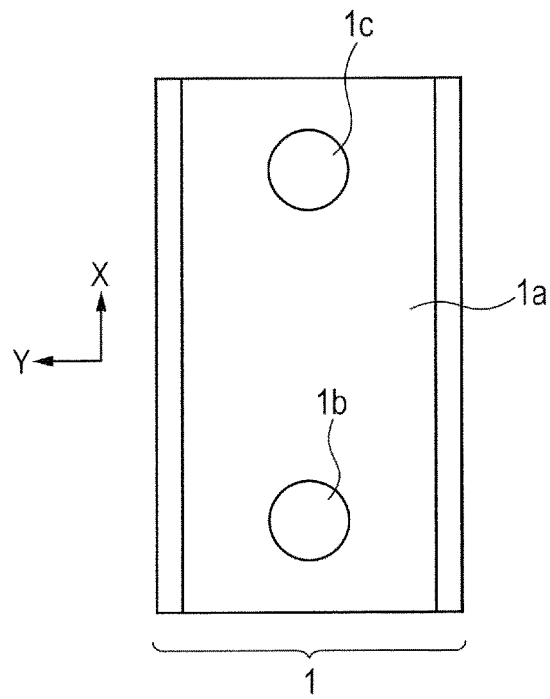
FIGS. 9A, 9B, 9C and 9D are views for explaining a shape of a vibration plate of a fourth embodiment.
Figure 9B:
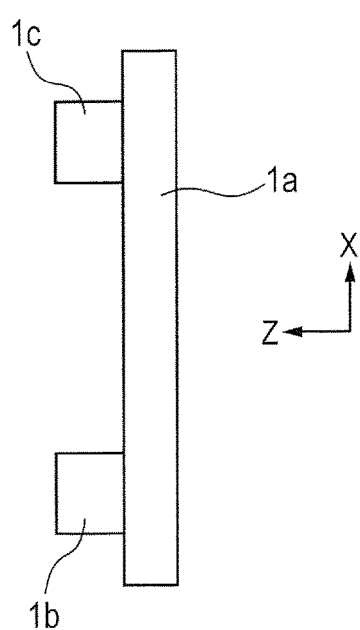
Figure 9C:
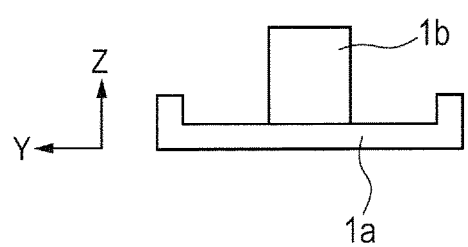
Figure 9D:
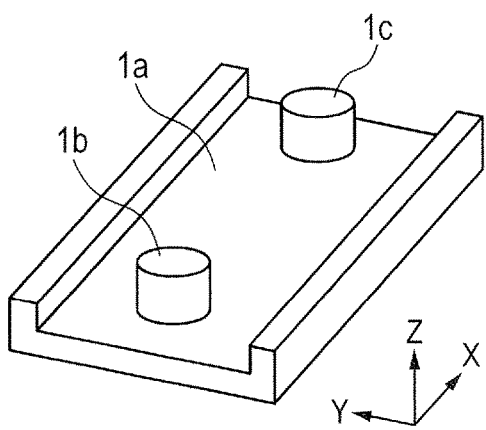

FIGS. 7A to 7D are views for explaining the shape of the vibration plate for use in the vibration wave motor of the second embodiment. FIGS. 7A, 7B, 7C and 7D show a front view of the vibration plate 1, a side view thereof in the long-side direction, a side view thereof in the short-side direction, and a perspective view of a bottom surface thereof, respectively. Note that, in FIG. 7A to FIG. 7D, the piezoelectric element 2 and the coupling portions 1d and 1e are omitted. As described above, a cross-sectional shape of the flat plate portion 1a on the Y-Z plane perpendicular to the flat plate portion 1a is formed into a recessed shape composed of a circular arc as shown in FIG. 7B so that the rigidity in the direction perpendicular to the traveling direction can become high in comparison with that of the flat plate with a constant thickness. In such a way, the elliptic motion generated on the tip ends of the protruding portions 1b and 1c becomes the elliptic motion approximate to the circle, and accordingly, the stable drive can be realized.

Third Embodiment

A description is made below of a third embodiment for embodying the invention.

In each of the first and second embodiments, the cross-sectional shape of the flat plate portion 1a is formed into the recessed shape, whereby the rigidity in a certain direction is changed to thereby adjust the resonance frequencies $f_1$ and $f_2$ of the two natural vibration modes, and the enhancement of the speed is achieved. In the third embodiment, unlike the first and second embodiments, such rigidity adjusting portions that can increase and decrease the rigidity are provided on the flat plate portion 1a. In such a way, the rigidity in a certain direction is changed to thereby adjust the resonance frequencies $f_1$ and $f_2$ of the two natural vibration modes, and the enhancement of the speed is achieved. Note that the same members as those in the first and second embodiments are illustrated by the same reference numerals. Moreover, a description of the same portions as those of the first and second embodiments is omitted, and a description is made of only portions different from those of the first and second embodiments.

FIGS. 8A to 8D re views for explaining the shape of the flat plate portion for use in the vibration wave motor of the third embodiment. FIG. 8A, FIG. 8B, FIG. 8C and FIG. 8D show a front view of the vibration plate 1, a side view thereof in the long-side direction, a side view thereof in the short-side direction, and a perspective view of a bottom surface thereof, respectively. Indications of the respective drawings are similar to those of FIGS. 5A to 5D. In the third embodiment, rigidity adjusting portions 1f which increase the X-direction rigidity are formed on the flat plate portion 1a. The rigidity adjusting portions 1f have projection portions, which are long in the X direction, on the flat plate portion 1a. The rigidity adjusting portions 1f may be molded integrally with the flat plate portion 1a by drawing, or other components may be adhered to the flat plate portion 1a.

The vibration plate 1 is formed, into the shape as described above, whereby the X-direction rigidity is increased in comparison with the flat plate with a constant thickness, and there rises the resonance frequency of the secondary natural vibration mode of the bending vibration in the long-side direction. In such a way the resonance frequency of the secondary natural vibration mode of the bending vibration in the long-side direction can be adjusted so as to establish $A_{d1} \approx A_{d2}$ in FIG. 4A without changing the X-direction dimension and Y-direction dimension of the flat plate portion 1a.

In the first embodiment, it is necessary that the entire surface of the flat plate portion 1a be formed into a curved surface in order to adjust the resonance frequencies; however, in the third embodiment, the resonance frequencies are adjusted by only providing the projection portions on a part of the flat plate portion 1a, and accordingly, there is a merit that it is easy to process the flat plate portion 1a.

Note that, in the third embodiment, the description is made of such an example where the projection portions, which are long in the X direction, are provided as the rigidity adjusting portions, and the X-direction rigidity is increased, whereby the resonance frequencies are adjusted; however, the resonance frequencies may be adjusted in such a manner that recessed portions, which are long in the X direction, are provided as the rigidity adjusting portions, and that the Y-direction rigidity is decreased.

Fourth Embodiment

A description is made below of a fourth embodiment for embodying the invention.

In the third embodiment, such rigidity adjusting portions that can increase or decrease the rigidity are provided on the flat plate portion 1a, whereby the rigidity in a certain direction is changed to thereby adjust the resonance frequencies $f_1$ and $f_2$ of the two natural vibration modes, and the enhancement of the speed is achieved. In the fourth embodiment, the vibration plate 1 is formed into a shape in which end portions are bent, the end portions having sides parallel to each other in the X direction among four sides of the flat plate portion 1a. The third embodiment is different from the second embodiment in that the rigidity in a certain direction is changed to thereby adjust the resonance frequencies $f_1$ and $f_2$ of the two natural vibration modes, and to achieve the enhancement of the speed. Note that the same members as those in the second embodiment are illustrated by the same reference numerals. Moreover, a description of the same portions as those of the second embodiment is omitted, and a description is made of only portions different from those of the second embodiment.

FIGS. 9A to 9D are views for explaining the shape of the flat plate portion for use in the vibration wave motor of the fourth embodiment. FIG. 9A, FIG. 9B, FIG. 9C and FIG. 9D show a front view of the vibration plate 1, a side view thereof in the long-side direction, a side view thereof in the short-side direction, and a perspective view of a bottom surface thereof, respectively. Indications of the respective drawings are similar to those described in FIGS. 5A to 5D. The flat plate portion 1a is formed into a shape in which end portions are bent, the end portions having sides parallel to each other in the X direction among four sides of the flat plate portion 1a.

The vibration plate 1 is formed into the shape as described above, whereby the X-direction rigidity is increased in comparison with the flat plate with a constant thickness, and there rises the resonance frequency of the secondary natural vibration mode of the bending vibration in the long-side direction. In such a way, the resonance frequency of the secondary natural vibration mode of the bending vibration in the long-side direction can be adjusted so as to establish $A_{d1} \approx A_{d2}$ in FIG. 4A without changing the X-direction dimension and Y-direction dimension of the flat plate portion 1a.

In the third embodiment, it is necessary to provide the projection portions on the flat plate portion 1a by the drawing and the adhesion of the other components in order to adjust the resonance frequencies; however, the fourth embodiment has a merit, that it is easy to process the flat plate portion 1a since the resonance frequencies are adjusted by only bending the end portions.

Fifth Embodiment

A description is made below of a fifth embodiment for embodying the invention.

The first embodiment shows the vibration wave motor that performs the relative movement in the long-side direction of the flat plate portion 1a by the elliptic motion generated on the tip ends of the protruding portions 1b and 1c by the high-frequency vibration. In the first embodiment, the cross-sectional shape of the flat plate portion 1a is formed into the recessed shape, whereby the rigidity in a certain direction is changed to thereby adjust the resonance frequencies $f_1$ and $f_2$ of the two natural vibration modes, and the enhancement of the speed is achieved.

The fifth embodiment is different from the first embodiment in that a similar effect is applied to a vibration wave motor that performs the relative movement in the short-side direction of the flat plate portion 1a by the elliptic motion generated on the tip ends of the protruding portions 1b and 1c by the high-frequency vibration. Note that the same members as those in the first embodiment are illustrated by the same reference numerals. Moreover, a description of the same portions as those of the first embodiment is omitted, and a description is made of only portions different from those of the first embodiment.

Figure 10A:
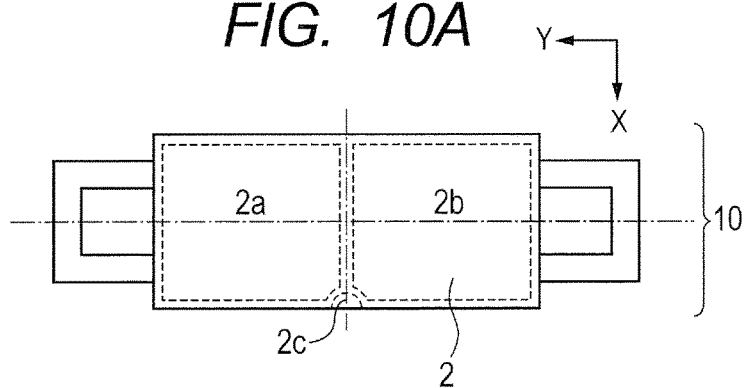
FIGS. 10A, 10B, 10C, 10D and 10E are views for explaining a configuration of a vibration wave motor of a fifth embodiment.
Figure 10C:
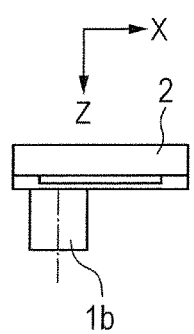
Figure 10B:
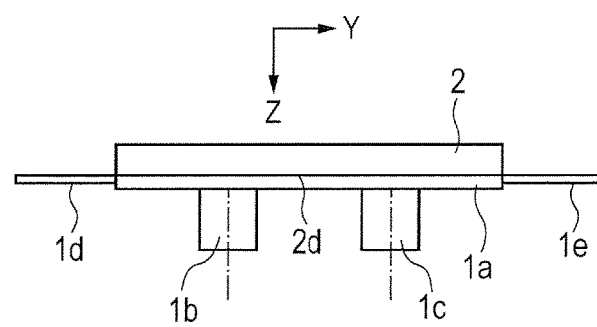
Figure 10D:
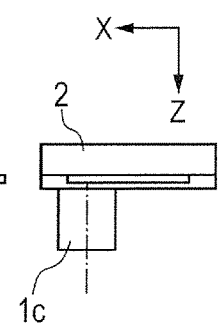
Figure 10E:
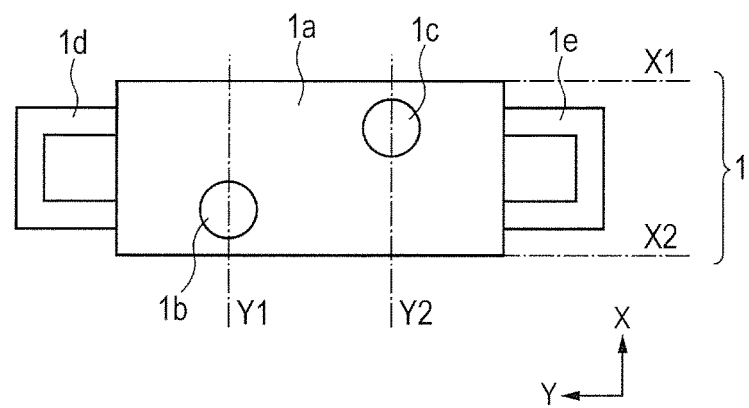

FIGS. 10A to 10E are views for explaining a basic configuration of the vibration wave motor of the fifth embodiment, and correspond to FIGS. 1A to 1E of the first embodiment. FIG. 10A is a plan view, FIG. 10B is a front view, FIG. 10C and FIG. 10D are side views, and FIG. 10E is a bottom view. A first natural vibration mode and a second natural vibration mode, which are two natural vibration modes perpendicular to each other, are excited on the flat plate portion 1a by the high-frequency vibration of the piezoelectric element 2.

In the fifth embodiment, the first natural vibration mode is the secondary natural vibration mode of the bending vibration in the long-side direction of the vibration plate 1, and the second natural vibration mode is the primary natural vibration mode of the bending vibration in the short-side direction of the vibration plate 1. As shown in FIG. 10E, the protruding portions 1b and 1c are provided in the vicinities of the antinodes (Y1 and Y2 shown in FIG. 10E) of the secondary natural vibration mode of the bending vibration in the long-side direction of the flat plate portion 1a. Furthermore, the protruding portions 1b and 1c are provided in vicinities of nodes (X1 and X2 shown in FIG. 10E) of the primary natural vibration mode of the bending vibration in the short-side direction.

Figure 11A:
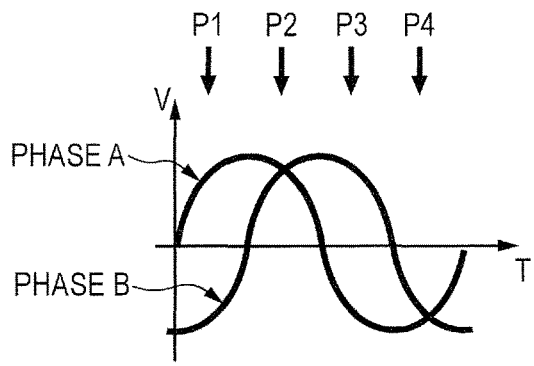
FIGS. 11A, 11B, 11C and 11D are views for explaining vibration states of the vibration wave motor of the fifth embodiment.
Figures 11B, 11C, 11D:
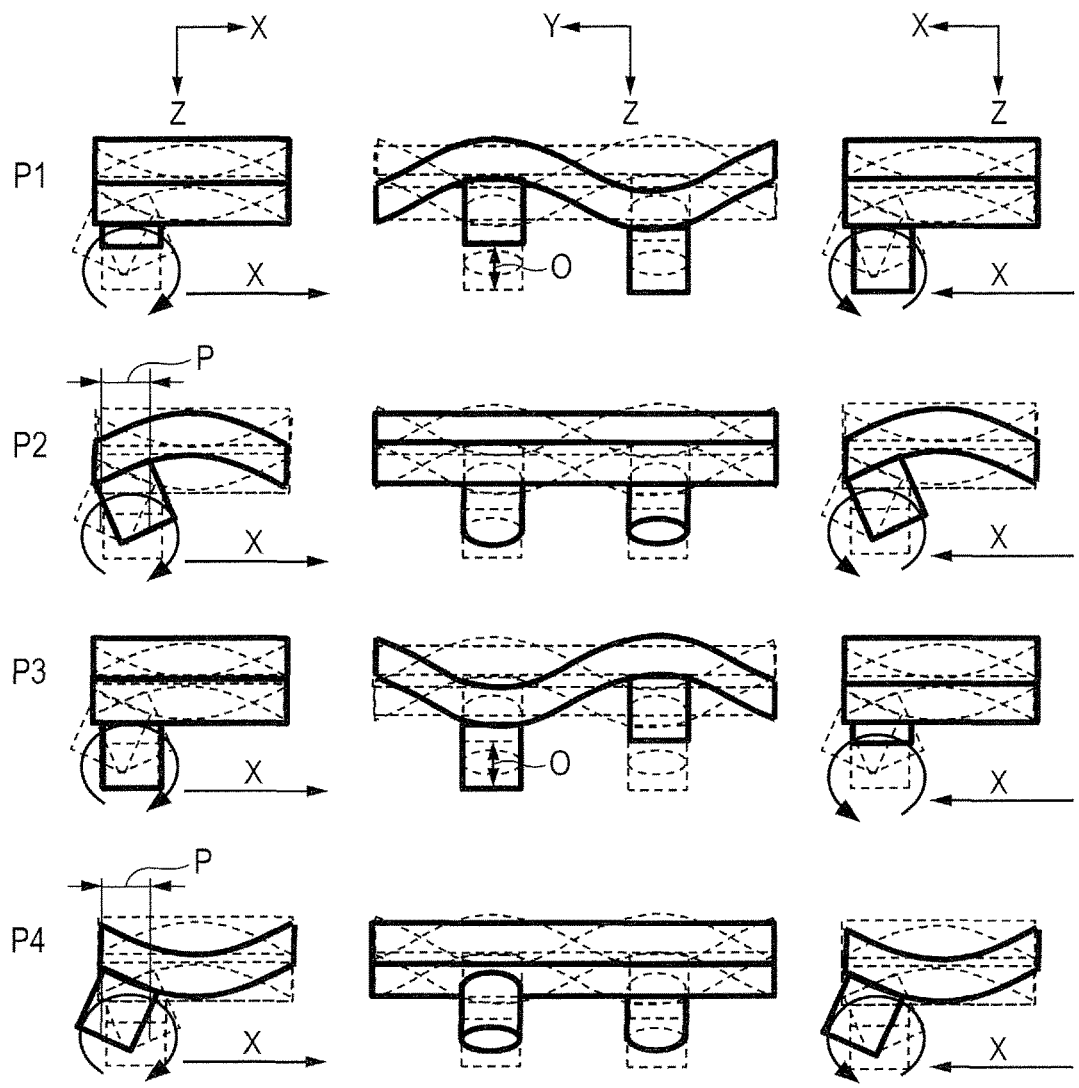
Figure 12A:
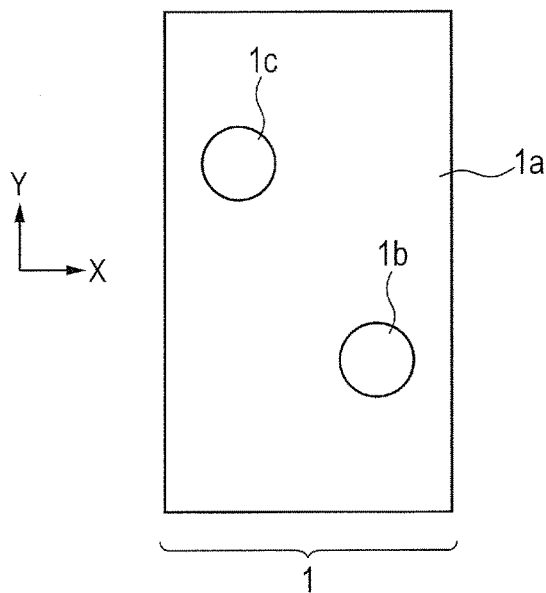
FIGS. 12A, 12B, 12C and 12D are views for explaining a shape of a vibration plate of the fifth embodiment.
Figure 12B:
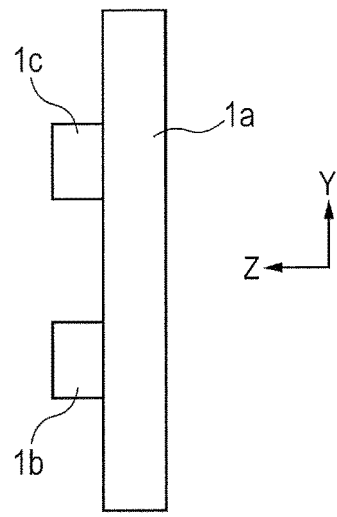
Figure 12C:
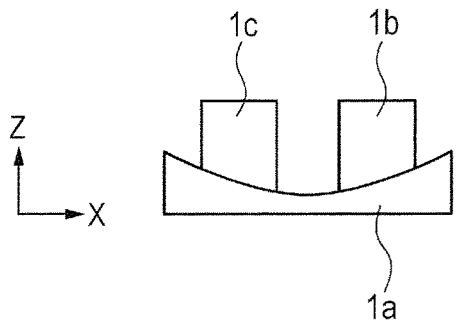
Figure 12D:
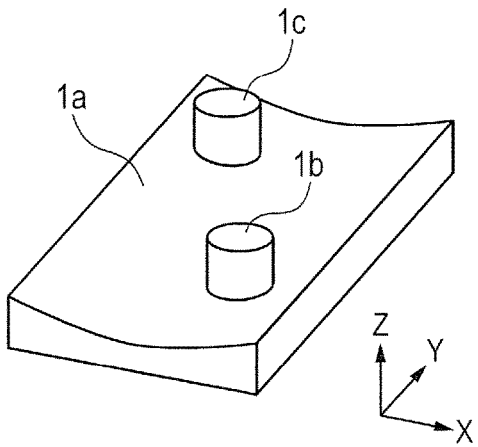

FIGS. 11A to 11D are views showing a state of the vibration in the case where the alternating current voltage is applied to the phase A and the phase B while delaying the phase of the phase B by approximately +90° with respect to the phase A, and correspond to FIGS. 2A to 2D of the first embodiment. FIG. 11B, FIG. 11C and FIG. 11D correspond to FIG. 10B, FIG. 10C and FIG. 10D, respectively, and show changes of the vibration, which are caused by the elapse of time, from P1 toward P4. Moreover, in FIGS. 11A to 11D, the piezoelectric element 2 and the coupling portions 1d and 1e are omitted. Furthermore, in FIGS. 11A to 11D, dotted lines show the states of the vibration.

At a time when voltages of the same symbol (polarity) are applied to the phase A and the phase B (P2 and P4 shown in FIGS. 11B to 11D), the phase A and the phase B extend and contract in the same way, whereby the primary natural vibration mode of the bending vibration in the short-side direction is excited, and the amplitude in the X direction becomes maximum (O shown in FIG. 11B). On the contrary, at a time when voltages of different symbols (polarities) are applied to the phase A and the phase B (P1 and P3 shown in FIG. 11B to FIG. 11D), the phase A and the phase B extend and contract in opposite directions, whereby the secondary natural vibration mode of the bending vibration in the long-side direction is excited, and the amplitude in the Z direction becomes maximum (P shown in FIG. 11C).

That is to say, as a result of applying the alternating current voltages to the phase A and the phase B while delaying the phase of the phase B by approximately +90° with respect to the phase A, elliptic motion as shown in FIG. 11C and FIG. 11D is generated on the tip ends of the protruding portions 1b and 1c. Therefore, the vibration plate 1 obtains the propulsive force by the friction generated for the friction member 3 by the elliptic motion of the protruding portions, and can perform the relative movement in the illustrated X direction. Moreover, in the case where the alternating current voltages are applied to the phase A and the phase B while delaying the phase of the phase B by approximately +270° with respect to the phase A, elliptic motion in a direction opposite to that of FIG. 11C and FIG. 11D is generated, and accordingly, the vibration plate 1 obtains the propulsive force by the friction, and can perform the relative movement in a direction opposite to X direction shown in FIG. 11C.

As described above, in the vibration wave motor of the fifth embodiment, it is possible for the vibration plate 1 to perform the relative movement with respect to the friction member 3 in the short-side direction of the vibration plate 1 by the elliptic motion generated on the tip ends of the protruding portions 1b and 1c by the high-frequency vibration. In such a way, a dimension of the vibration wave motor in the traveling direction is shortened, thus making it possible to miniaturization thereof.

As mentioned above, by the vibration wave motor that generates the elliptic motion by using the two natural vibration modes, it has been difficult to allow the amplitudes of both thereof at the time of the resonance to coincide with each other. This results from that the orders of the two natural vibration modes for use are different from each other, that there is a difference between the X-direction dimension and Y-direction dimension of the flat plate portion, and that the vibration inhibited by the coupling portions 1d and 1e.

In particular, in comparison with such a configuration as in the vibration wave motor of the first embodiment, in which the vibration wave motor performs the relative movement in the long-side direction of the flat plate portion 1a, the difference between the maximum amplitudes of the two natural vibration modes becomes larger in the configuration shown in this embodiment, in which the vibration wave motor performs the relative movement in the short-side direction of the flat plate portion 1a. Following this, the difference between the amplitudes $A_{d1}$ and $A_{d2}$ in the event of the relative movement at the drive frequency $f_d$, and accordingly, the elliptic motion becomes horizontally long elliptic motion in which the difference between the Z-direction amplitude and X-direction amplitude of the elliptic motion on the tip ends of the protruding portions 1b and 1c is large, the Z-direction amplitude falls short, and accordingly, the drive becomes unstable.

FIGS. 12A to 12D are views for explaining the shape of the flat plate portion for use in the vibration wave motor of the fifth embodiment. FIG. 12A, FIG. 12B, FIG. 12C and FIG. 12D show a front view of the vibration plate 1, a side view thereof in the long-side direction, a side view thereof in the short-side direction, and a perspective view of a bottom surface thereof, respectively. Indications of the respective drawings are similar to those described in FIGS. 5A to 5D. In the flat plate portion 1a, a cross-sectional thereof on the X-Z plane perpendicular to the flat plate portion 1a is formed into a recessed shape so that the rigidity in the traveling direction can become high in comparison with that of the flat plate with a constant thickness. The recessed shape refers to a shape in which one side among four sides of a rectangle is formed into an inwardly projecting curve. Moreover, in a case where an entire thickness of the vibration plate 1 is small in comparison with the flat plate with a constant thickness, the rigidity in the direction perpendicular to the traveling direction decreases.

The vibration plate 1 is formed into the shape as described above, whereby the X-direction rigidity is increased in comparison with the flat plate with a constant thickness, and there rises the resonance frequency of the secondary natural vibration mode of the bending vibration in the long-side direction. Alternatively, the Y-direction rigidity decreases, and there lowers the resonance frequency of the primary natural vibration mode of the bending vibration in the short-side direction. In such a way, the resonance frequencies $f_1$ and $f_2$ of the two natural vibration modes can be adjusted so as to establish $A_{d1} \approx A_{d2}$ in FIG. 4A without changing the X-direction dimension and Y-direction dimension of the flat plate portion 1a. $A_{d1} \approx A_{d2}$ is established, whereby the elliptic motion generated on the tip ends of the protruding portions 1b and in becomes the elliptic motion approximate to the circle, and accordingly, the vibration wave motor can be driven stably.

In the vibration wave motor shown in the first embodiment, the vibration plate 1 performs the relative movement in the long-side direction of the flat plate portion 1a. Moreover, in the vibration wave motor shown in the fifth embodiment, the vibration plate 1 performs the relative movement in the short-side direction of the flat plate portion 1a. In comparison with the first embodiment, in the fifth embodiment, the elliptic motion becomes horizontally long elliptic motion in which the difference between the Z-direction amplitude and X-direction amplitude of the elliptic motion on the tip ends of the protruding portions 1b and 1c is larger, and accordingly, the drive becomes more unstable. However, the cross-sectional shape of the flat plate portion 1a is formed into the recessed shape, whereby the elliptic motion approximate to the circle can be obtained, and accordingly, the fifth embodiment has a merit that a larger effect can be obtained in comparison with the first embodiment.

The description has been made above of the preferred embodiments of the present invention; however, the present invention is not limited to these embodiments, and is modifiable and changeable in various ways within the scope of the spirit thereof. For example, the vibration wave motor may be an ultrasonic motor in which a vibration plate performs an ultrasonic vibration.

The present invention is usable for an electric instrument, for which small lightweight and a wide drive speed range are required, and in particular, for a lens drive device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-145638, filed Jul. 16, 2014, which is hereby incorporated by reference herein in its entirety.

What is claimed is:

1. A vibration wave motor comprising:
a vibration plate including a rectangular flat plate portion and protruding portions provided on the flat plate portion, wherein the flat plate portion has an uneven thickness excluding the protruding portions;
a piezoelectric element that is fixed to the vibration plate and performs high-frequency vibration;
a friction member brought into contact with the protruding portions; and
a first natural vibration mode of a bending vibration and a second natural vibration mode of a bending vibration, which are excited in the vibration plate by the high-frequency vibration, the vibration plate and the friction member moving relatively to each other,
wherein maximum amplitude generated on tip ends of the protruding portions by the first natural vibration mode is larger than maximum amplitude generated on tip ends of the protruding portions by the second natural vibration mode,
a resonance frequency of the first natural vibration mode is lower than a resonance frequency of the second natural vibration mode, and
amplitudes of the first natural vibration mode and the second natural vibration mode in a frequency range at a time of drive substantially coincide with each other.

2. The vibration wave motor according to claim 1, wherein the first natural vibration mode is a primary natural vibration mode of a bending vibration in a short-side direction of the vibration plate, the second natural vibration mode is a secondary natural vibration mode of a bending vibration in a long-side direction of the vibration plate, and the vibration plate moves relatively to the friction member in the long-side direction of the vibration plate.

3. The vibration wave motor according to claim 1, wherein the first natural vibration mode is a secondary natural vibration mode of a bending vibration in a long-side direction of the vibration plate, the second natural vibration mode is a primary natural vibration mode of a bending vibration in a short-side direction of the vibration plate, and the vibration plate moves relatively to the friction member in the long-side direction of the vibration plate.

4. The vibration wave rotor according to claim 1, wherein the first natural vibration mode is a secondary natural vibration mode of a bending vibration in a long-side direction of the vibration plate, the second natural vibration mode is a primary natural vibration mode of a bending vibration in a short-side direction of the vibration plate, and the vibration plate moves relatively to the friction member in the short-side direction of the vibration plate.

5. The vibration wave motor according to claim 1, wherein the first natural vibration mode is a primary natural vibration mode of a bending vibration in a short-side direction of the vibration plate, the second natural vibration mode is a secondary natural vibration mode of a bending vibration in a long-side direction of the vibration plate, and the vibration plate moves relatively to the friction member in the short-side direction of the vibration plate.

6. The vibration wave motor according to claim 1, wherein the frequency range at the time of the drive is a higher frequency range than the resonance frequencies of both of the first natural vibration mode and the second natural vibration mode.

7. The vibration wave motor according to claim 1, wherein the vibration motor is an ultrasonic motor in which the vibration plate performs ultrasonic vibration.

* * * * *